US010747213B2

(12) United States Patent
Ryu et al.

(10) Patent No.: US 10,747,213 B2
(45) Date of Patent: Aug. 18, 2020

(54) SCHEDULING OPTIMIZATION SYSTEM AND METHOD IN HOT PRESS FORGING PROCESS

(71) Applicant: Pusan National University Industry-University Cooperation Foundation, Busan (KR)

(72) Inventors: Kwang-Ryel Ryu, Busan (KR); Seyoung Kim, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 0 days.

(21) Appl. No.: 16/693,009

(22) Filed: Nov. 22, 2019

(65) Prior Publication Data

US 2020/0209840 A1 Jul. 2, 2020

(30) Foreign Application Priority Data

Dec. 28, 2018 (KR) .................. 10-2018-0171620

(51) Int. Cl.
*G05B 19/41* (2006.01)
*G05B 13/02* (2006.01)
(Continued)

(52) U.S. Cl.
CPC ... *G05B 19/41885* (2013.01); *G05B 13/0265* (2013.01); *G05B 13/041* (2013.01);
(Continued)

(58) Field of Classification Search
CPC ...... G05B 15/02; G05B 13/026; G05B 13/04; G05B 19/41865; G05B 2219/24075;
(Continued)

(56) References Cited

U.S. PATENT DOCUMENTS

2008/0300705 A1* 12/2008 Bagchi ............. G05B 19/41865
700/100
2011/0208337 A1* 8/2011 Norman ................ G06Q 10/06
700/97

FOREIGN PATENT DOCUMENTS

JP 2006318228 11/2006
KR 101460295 11/2014
(Continued)

OTHER PUBLICATIONS

Shin, H. J.; et al. "A Production Planning Algorithm for a Supply Chain Network Considering Back-Order and Resource Capacity Using GRASP Method," Journal of the Society of Korea Industrial and Systems Engineering, vol. 32, No. 3, Sep. 2009, pp. 29-39.
(Continued)

*Primary Examiner* — Michael J Brown
(74) *Attorney, Agent, or Firm* — Leber IP Law; David C. Robertson

(57) ABSTRACT

Provided is a scheduling optimization system and method of a hot process forging process. The scheduling optimization system of the hot process forging process may include a scheduling optimization module configured to receive an order amount and to establish a work scheduling and a scheduling evaluation module configured to receive the established work scheduling from the scheduling optimization module, to evaluate the work scheduling based on a predicted lead time and energy use amount derived through a cost prediction model-based simulation, and to forward an evaluation result to the scheduling optimization module. The optimal work scheduling may be established using the scheduling optimization module and the scheduling evaluation module.

11 Claims, 13 Drawing Sheets

(51) Int. Cl.
    *G05B 13/04*         (2006.01)
    *G06Q 10/04*        (2012.01)
    *G06Q 10/06*        (2012.01)
    *G05B 19/418*       (2006.01)
    *G05B 15/02*        (2006.01)
    *G06F 1/329*        (2019.01)
    *G06F 9/48*         (2006.01)

(52) U.S. Cl.
    CPC ..... *G05B 13/048* (2013.01); *G05B 19/41865* (2013.01); *G06Q 10/04* (2013.01); *G06Q 10/06312* (2013.01); *G06Q 10/06313* (2013.01)

(58) Field of Classification Search
    CPC .......... G05B 2219/2639; G05B 13/042; G05B 17/02; G05B 2219/32015; G05B 2219/32247; G05B 2219/34418; G05B 13/041; G05B 13/048; G05B 13/0265; G05B 19/41885; G06F 9/4893; G06F 1/329; G06F 8/443; G06F 9/3001; G06F 9/5094; G06Q 10/04; G06Q 10/06312; G06Q 10/06313
    USPC .......................................................... 700/97
    See application file for complete search history.

(56) References Cited

FOREIGN PATENT DOCUMENTS

| | | |
|---|---|---|
| KR | 101868501 | 6/2018 |
| KR | 20180075798 | 7/2018 |

OTHER PUBLICATIONS

Decision of Refusal issued on KR Application No. 10-2018-0171620, dated Jun. 28, 2019, and English translation, 9 pages.
Notice of Allowance issued on KR Application No. 10-2018-0171620, dated Aug. 20, 2019, and English translation, 5 pages.

\* cited by examiner

US 10,747,213 B2

SCHEDULING OPTIMIZATION SYSTEM AND METHOD IN HOT PRESS FORGING PROCESS

CROSS-REFERENCE TO RELATED APPLICATION

This application claims the priority benefit of Korean Patent Application No. 10-2018-0171620, filed on Dec. 28, 2018, in the Korean Intellectual Property Office, the disclosure of which is incorporated herein by reference.

BACKGROUND

1. Field of the Invention

The following description of example embodiments relates to a scheduling optimization system and method of a hot process forging process, and more particularly, to a scheduling optimization system and method of a hot process forging process that may establish an optimal work scheduling based on a simulation.

2. Description of the Related Art

Hot process forging refers to a process of generating a desired shape by pressing an ingot heated at a high temperature, and may use a furnace as a facility for heating the ingot. A plurality of ingots may be heated together in the furnace and may be taken out after all of the heating process is completed. To modify a shape of the ingot, a temperature of an ingot is important. Therefore, although the heating process is completed using a target temperature, the ingot stands by in the furnace and is taken out from the furnace when a rear end process is available.

When a door of the furnace is opened to extract the ingot, heat loss occurs inside the furnace. Therefore, a reheating process is performed to increase a temperature of an ingot remaining in the furnace after closing the door of the furnace. As described above, the furnace continuously operates to heat the ingot and to maintain a temperature of the ingot, which may lead to significantly increasing a relatively great energy cost used to produce a product.

Although the same product is produced, an amount of energy used for heating varies based on a combination of raw materials heated together in the furnace. Further, an amount of time in which a heated material stands by in the furnace varies based on a state of a post processing, which may affect the energy efficiency.

Accordingly, to increase the energy efficiency and to improve the productivity, a work scheduling needs to be optimized. A work scheduling is established based on an experience of an operator on the field. Although the work scheduling is established based on a capacity of facility and a target production amount, the work scheduling is generally established to preferentially process an order with an imminent deadline. Therefore, no action is taken to improve the energy efficiency.

Korean Registration Patent 10-1868501 relates to a forging molding method, and describes technology for determining a raw material group candidate to be placed in a furnace based on a rule and determining a group based on a point function.

SUMMARY

Example embodiments provide a scheduling optimization system and method of a hot process forging process, and more particularly, provides technology for optimizing a raw material group to be placed in a furnace using an optimization algorithm.

Example embodiments also provide a scheduling optimization system and method of a hot process forging process that may establish an optimal work scheduling by performing a scheduling evaluation through a scheduling optimization and a prediction model-based simulation based on received information.

Example embodiments also provide a scheduling optimization system and method of a hot process forging process that may improve energy efficiency and productivity by updating a cost prediction model based on process data that is continuously accumulated and by optimizing a work scheduling.

According to an aspect of example embodiments, there is provided a scheduling optimization system of a hot process forging process, the scheduling optimization system including a scheduling optimization module configured to receive an order amount and to establish a work scheduling; and a scheduling evaluation module configured to receive the established work scheduling from the scheduling optimization module, to evaluate the work scheduling based on a predicted lead time and energy use amount derived through a cost prediction model-based simulation, and to forward an evaluation result to the scheduling optimization module. Here, the scheduling optimization system may establish the optimal work scheduling using the scheduling optimization module and the scheduling evaluation module.

The scheduling optimization system may further include a process cost prediction model management module configured to update a cost prediction model of the scheduling evaluation module based on process data that is continuously accumulated.

The scheduling optimization module may be configured to directly receive the order amount every time an order is received from an operator or to acquire the order amount through interaction with an Enterprise Resource Planning (ERP) system.

The scheduling optimization module may acquire a work status for each facility and a current energy use status through interaction with a runtime process monitoring system and may establish the work scheduling by applying the work status for each facility and the current energy use status.

The scheduling optimization module may establish the work scheduling by selecting a relatively high priority order amount from among the received order amounts.

The process cost prediction model management module may establish the optimal work scheduling using a rolling horizon scheme of updating the optimal work scheduling being applied to apply a prediction error or an amount modification and thereby periodically updating the work scheduling.

The cost prediction model may be trained using a machine training algorithm based on the process data.

The scheduling evaluation module may establish a work scheduling of a rear end process through the cost prediction model-based simulation when a combination of raw materials to be placed in a furnace is determined and may derive the work scheduling of the entire process and the predicted lead time and energy use amount when the cost prediction model-based simulation is completed.

The scheduling evaluation module may place a raw material in the furnace according to the work scheduling of the furnace, may find a predicted point in time at which a heating is completed using a lead time prediction model of a heating process, may allow a facility that requires to determine a work to subsequently process to select and process a relatively high priority work from among candidate works that are completely heated and thereby extractable, may predict a predicted lead time and energy use amount of process processing of each facility through a lead time prediction model and an energy use amount prediction model of a process of each facility, and may repeatedly perform a simulation until all of the products are completed.

According to an aspect of example embodiments, there is provided a scheduling optimization method of a hot process forging process, the scheduling optimization method including receiving an order amount; establishing a work scheduling for the order amount; evaluating the established work scheduling based on a predicted lead time and energy use amount derived through a cost prediction model-based simulation; and applying the optimal work scheduling when the evaluation is terminated.

The receiving of the order amount may include directly receiving the order amount every time an order is received from an operator or acquiring the order amount through interaction with an ERP system.

The scheduling optimization method may further include acquiring a work status for each facility and a current energy status through a runtime processing monitoring system and establishing the work scheduling by applying the work status for each facility and the current energy status.

The scheduling optimization method may further include selecting a relatively high priority order amount from among the received order amounts prior to establishing the work scheduling, and the establishing of the work scheduling for the order amount may include establishing the work scheduling for the selected relatively high priority order amount.

The scheduling optimization method may further include updating the optimal work scheduling being applied to apply a prediction error or a change modification and may include establishing the work scheduling using a rolling horizon scheme of periodically updating the work scheduling.

The cost prediction model may be trained using a machine training algorithm based on process data.

The evaluating of the work scheduling based on the predicted lead time and energy use amount derived through the cost prediction model-based simulation may include establishing a work scheduling of a rear end process through the cost prediction model-based simulation when a combination of raw materials to be placed in a furnace is determined and deriving the work scheduling of the entire process and the predicted lead time and energy use amount when the cost prediction model-based simulation is terminated.

The establishing of the work scheduling of the rear end process through the cost prediction model-based simulation may include placing a raw material in the furnace according to the work scheduling of the furnace, finding a predicted point in time at which a heating is completed using a lead time prediction model of a heating process, allowing a facility that requires to determine a work to subsequently process to select and process a relatively high priority work from among candidate works that are completely heated and thereby extractable; predicting a predicted lead time and an energy use amount of process processing of each facility through a lead time prediction model and an energy use amount prediction model of each facility; and repeatedly performing a simulation until all of the products are completed.

The combination of raw materials to be placed in the furnace may be determined by optimizing the work scheduling using a genetic algorithm.

According to an aspect of example embodiments, there is provided a scheduling optimization method of a hot process forging process, the scheduling optimization method including establishing a work scheduling based on input information using a scheduling optimization module and a scheduling evaluation module through a cost prediction model-based simulation; and updating the cost prediction model based on process data that is continuously accumulated through a process cost prediction model management module.

According to some example embodiments, there may be provided a scheduling optimization system and method of a hot process forging process that may establish an optimal work scheduling by performing a scheduling evaluation through a scheduling optimization and a prediction model-based simulation based on received information.

According to some example embodiments, there may be provided a scheduling optimization system and method of a hot process forging process that may improve energy efficiency and productivity by optimizing a work scheduling and may predict production cost at the same time of establishing the work scheduling.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
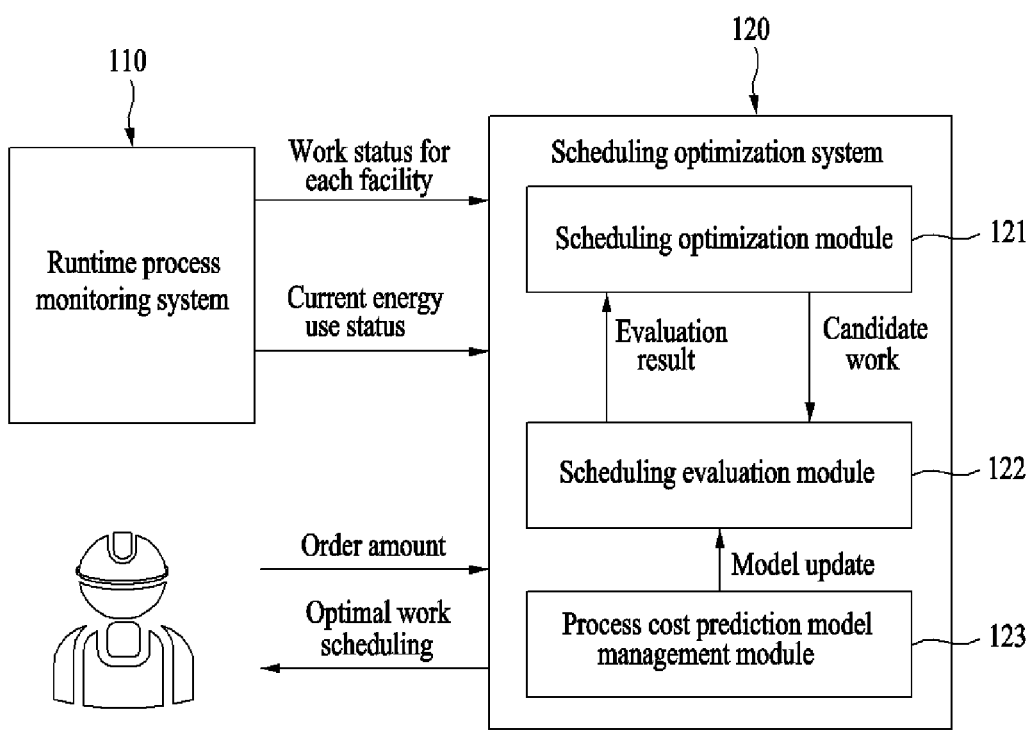
FIG. 1 is a diagram illustrating an example of a structure of a system for establishing a work scheduling of a hot process forging process according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

When a component is described to be on another component, the component may be directly formed on the other component or a third component may be provided between the components. Also, in the drawings, thicknesses of components may be exaggerated to effectively describe technical content. Unless otherwise noted, like reference numerals refer to like components throughout the attached drawings and written description, and thus descriptions will not be repeated.

The example embodiments described herein will be described with the accompanying drawings. In the drawings, thicknesses of layers, regions, etc., may be exaggerated for effective description of the technical content. Accordingly, regions illustrated in the drawings may have general attributes and shapes of the regions are merely provided as examples and not construed to limit the scope of the disclosure. Terms "first", "second", "third", etc., are used to describe various components and the components should not be limited by the terms. The terms are simply used to distinguish one component from another component. The examples described herein include their complimentary example embodiments.

The example embodiments and the terms used herein are not construed to limit the disclosure to specific example embodiments and may be understood to include various modifications, equivalents, and/or substitutions. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof.

Hereinafter, example embodiments are described with reference to the accompanying drawings. However, various modifications may be made to the example embodiments and are not construed as being limiting. Also, the example embodiments are provided for full understanding of those skilled in the art. Shapes and sizes, etc., of components in the drawings may be exaggerated for clarity of description.

The following example embodiments provide a work scheduling method for the entire process including a furnace work scheduling, and also provide a scheduling optimization system and method of a hot process forging process that may optimize a group of raw materials to be placed in a furnace using an optimization algorithm.

The example embodiments may provide a work scheduling optimization method through a simulation based on an energy use amount and a process lead time prediction model, and may apply a learned time and energy cost prediction model for a work scheduling using a machine training algorithm based on previous process data for each facility.

FIG. 1 is a diagram illustrating an example of a structure of a system for establishing a work scheduling of a hot process forging process according to an example embodiment.

A scheduling optimization system 120 of a hot process forging process is described with reference to FIG. 1. Here, the term "work" represents a workpiece to be processed by a facility and a work scheduling represents sequence of a workpiece to be processed for each facility of a factory.

The scheduling optimization system 120 may receive a work status for each facility, a current energy use status, and an order amount, and may output an optimal work scheduling.

The scheduling optimization system 120 may acquire the work status for each facility and the current energy use status through interaction with a runtime process monitoring system 110. Every time an order is received, an operator 111 may input an order amount. The operator 111 may directly input the order into the scheduling optimization system 120 or may acquire the order through interaction with an Enterprise Resource Planning (ERP) system.

The scheduling optimization system 120 may establish a work scheduling based on the received information using a scheduling optimization module 121 and a scheduling evaluation module 122 through a prediction model-based simulation.

A process cost prediction model management module 123 of the scheduling optimization system 120 may update a prediction model based on process data that is continuously accumulated.

Hereinafter, the scheduling optimization system 120 of the hot process forging process will be further described.

The scheduling optimization system 120 of the hot process forging process may include the scheduling optimization module 121 and the scheduling evaluation module 122, and may establish the optimal work scheduling using the scheduling optimization module 121 and the scheduling evaluation module 122. Depending on example embodiments, the scheduling optimization system 120 of the hot process forging process may further include a process cost prediction model management module 123.

The scheduling optimization module 121 may receive the order amount and may establish the work scheduling. Every time an order is received from the operator 111, the scheduling optimization module 121 may directly receive an order amount or may acquire the order amount through interaction with the ERP system. Also, the scheduling optimization module 121 may acquire a work status for each facility and a current energy use status through interaction with the runtime process monitoring system 110 and may establish the work scheduling by applying the work status for each facility and the current energy use status.

The scheduling optimization module 121 may establish the work scheduling by selecting a relatively high priority order amount from among the received entire order amounts.

The scheduling evaluation module 122 may receive the established work scheduling from the scheduling optimization module 121, may evaluate the work scheduling based on a predicted lead time and an energy use amount derived through a cost prediction model-based simulation, and may forward an evaluation result to the scheduling optimization module 121. Here, a cost prediction model may be trained using a machine training algorithm based on process data.

For example, the scheduling evaluation module 122 may establish a work scheduling of a rear end process through the cost prediction model-based simulation when a combination of raw materials to be placed in a furnace is determined, and may derive the work scheduling of the entire process and the predicted lead time and energy use amount when the cost prediction model-based simulation is completed. In detail, the scheduling evaluation module 122 may place a raw material in the furnace according to the work scheduling of the furnace, may find a predicted point in time at which a heating is completed using a lead time prediction model of a heating process, may allow a facility that requires to determine a work to subsequently process to select and process a relatively high priority work from among candidate works that are completely heated and thereby extractable, may predict a predicted lead time and energy use amount of process processing of each facility through a lead time prediction model and an energy use amount prediction model of a process for each facility, and may repeatedly perform a simulation until all of the products are completed.

The process cost prediction model management module 123 may update the cost prediction model of the scheduling evaluation module 122 based on process data that is continuously accumulated. As described above, the process cost prediction model management module 123 may establish the optimal work scheduling using a rolling horizon scheme of periodically updating the work scheduling by updating the optimal work scheduling being applied to apply a prediction error or an order modification.

Figure 2:
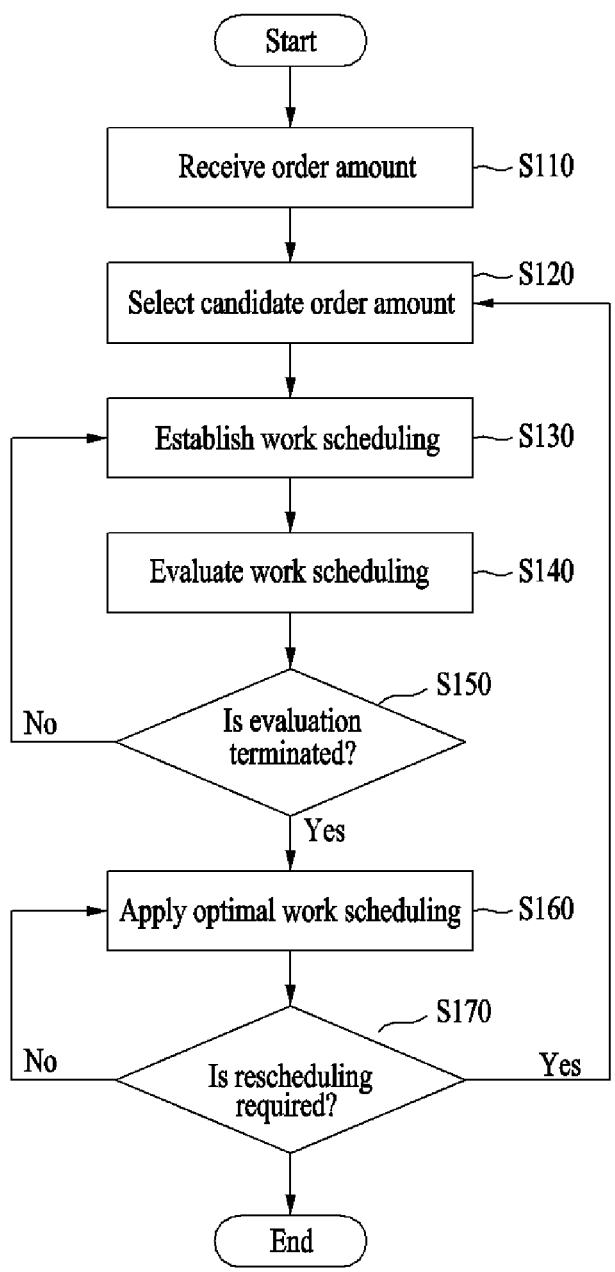
FIG. 2 is a flowchart illustrating an example of a scheduling optimization method of a hot process forging process according to an example embodiment.

FIG. 2 is a flowchart illustrating an example of a scheduling optimization method of a hot process forging process according to an example embodiment.

Referring to FIG. 2, the scheduling optimization method of the hot process forging process may include operation S110 of receiving an order amount, operation S130 of establishing a work scheduling for the received order amount, operation S140 of evaluating the established work scheduling based on a predicted lead time and energy use amount derived through a cost prediction model-based simulation, and operation S160 of applying the optimal work scheduling when the evaluation is completed in operation S150.

Also, the scheduling optimization method may further include operation S120 of selecting a relatively high priority order amount from among the received order amounts prior to establishing the work scheduling in operation S130.

If there is a need to reestablish the work scheduling in operation S170, the scheduling optimization method may further include updating the optimal work scheduling being applied to apply a prediction error or an amount modification. Updating of the optimal work scheduling may be performed through operations Accordingly, the optimal work scheduling may be established using a rolling horizon scheme of periodically updating the work scheduling.

Hereinafter, each operation will be further described.

The scheduling optimization method of the hot process forging process according to an example embodiment may be described, for example, through a scheduling optimization system of a hot process forging process according to an example embodiment, which is described above with reference to FIG. 1. The scheduling optimization system of the hot process forging process may include a scheduling optimization module and a scheduling evaluation module and, depending on example embodiments, may further include a process cost prediction model management module.

In operation S110, the scheduling optimization module may receive the order amount. Every time an order is received from an operator, the scheduling optimization module may directly receive an order amount or may acquire the order amount through interaction with an ERP system. Once the order amount is given, the scheduling optimization module may find the optimal work scheduling by evaluating a variety of work scheduling.

Also, the scheduling optimization module may acquire a work status for each facility and a current energy use status through interaction with a runtime process monitoring system and may establish the work scheduling by applying the work status for each facility and the current energy use status.

In operation S120, the scheduling optimization module may establish the work scheduling for the entire order amounts and may also establish the work scheduling by selecting a relatively high priority order amount from among the received order amounts.

In operation S130, the scheduling optimization module may establish the work scheduling for the received order amount.

In operation S140, the scheduling evaluation module may evaluate the established work scheduling based on a predicted lead time and energy use amount derived through a cost prediction model-based simulation. Here, a cost prediction model may be trained using a machine training algorithm based on process data.

When the evaluation of the scheduling evaluation module is completed in operation S150, the scheduling optimization module may receive an evaluation result from the scheduling evaluation module and may apply or output the optimal work scheduling in operation S160.

In operation S170, when there is a need to reestablish the work scheduling, the process cost prediction model management module may update the optimal work scheduling being applied to apply a prediction error or an amount modification.

Although the optimal work scheduling is established, updating of the work scheduling may be required due to a field situation, such as, for example, uncertainty by a prediction error and addition of an order amount with an imminent deadline. Accordingly, the work scheduling may be established using a rolling horizon scheme of periodically updating the work scheduling.

In operation S140 of evaluating the work scheduling based on the predicted lead time and energy use amount derived through the cost prediction model-based simulation, the scheduling evaluation module may establish a work scheduling of a rear end process through a cost prediction model-based simulation when a combination of raw materials to be placed in the furnace is determined.

In detail, to establish the work scheduling of the rear end process through the cost prediction model-based simulation, the scheduling evaluation module may place a raw material in a furnace according to the work scheduling of the furnace, may find a predicted point in time at which a heating is completed using a lead time prediction model of a heating process, may allow a facility that requires to determine a work to subsequently process to select and process a relatively high priority work from among candidate works that are completely heated and thereby extractable, may predict a predicted lead time and energy use amount of process processing of each facility through a lead time prediction model and an energy use amount prediction model of each facility, and may repeatedly perform a simulation until all of the products are completed. Here, a combination of raw materials to be placed in the furnace may be determined by optimizing the work scheduling using a genetic algorithm.

A scheduling optimization method of a hot process forging process according to another example embodiment may include establishing a work scheduling based on received information using a scheduling optimization module and a scheduling evaluation module through a cost prediction model-based simulation and updating a cost prediction model based on process data that is continuously accumulated through a process cost prediction model management module. The aforementioned description may apply to each of operations included in the scheduling optimization method of the hot process forging process and accordingly, further description is omitted.

Hereinafter, a method of establishing an optimal work scheduling through a cost prediction model-based simulation is described.

Figure 3:
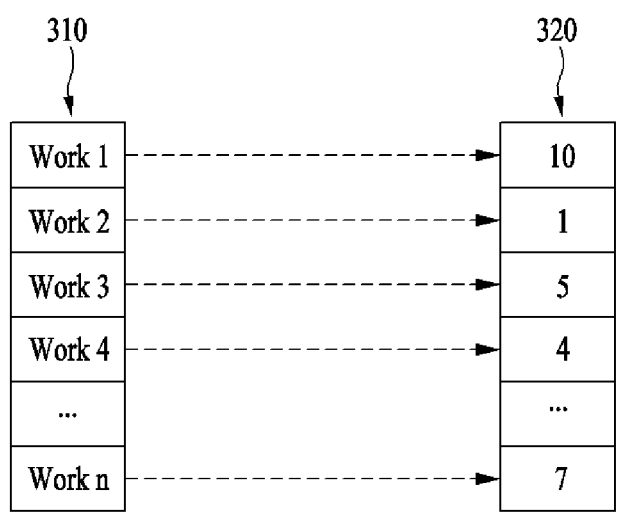
FIG. 3 illustrates an example of representing a solution for a scheduling optimization according to an example embodiment.

FIG. 3 illustrates an example of representing a solution for a scheduling optimization according to an example embodiment.

An optimization algorithm, such as a genetic algorithm, may be used to optimize a work scheduling. A solution may be represented using a number 320. Here, each number 320 denotes a number of a furnace that performs a heating process for each corresponding work 310. That is, the number 320 represents a combination of a work (raw material) to be placed with in the furnace.

Since a capacity to be placed in a furnace is determined, all of materials may not be heated at a time. Accordingly, every time each corresponding work is completed in the furnace, a subsequent raw material combination is placed in the furnace, which may be repeated until the heating process is completed with respect to all of the works.

When a combination of raw materials to be placed in a corresponding furnace is determined, a work scheduling of a rear end process may be established through a prediction model-based simulation. The rear end process may include, for example, a pressing process of forming a shape by pressing a heated material, a ring-milling process of punching a hole into a material to form a ring-shaped product, a cutting process of cutting a material, and a heat treatment process of changing a property of a material to be solid. Also, a facility for processing each process may include, for example, a presser, a ring-miller, a cutter, a heat treatment furnace, and the like.

Hereinafter, a process of establishing a work scheduling of a rear end process will be described.

A raw material may be placed in a furnace according to a work scheduling of the furnace. A predicted point in time at which a heating is completed may be found using a lead time prediction model of a heating process. A facility that requires to determine a work to subsequently process may select and process a relatively high priority work from among candidate works that are completely heated and thereby extractable. A lead time and an energy use amount of process processing of each facility may be predicted using a process lead time prediction model and an energy use amount prediction model of each facility. A simulation may be performed by repeating the aforementioned process until all of the products are completed. Once the simulation is terminated, the work scheduling of the entire process and the predicted lead time and energy use amount may be driven.

Figure 4:
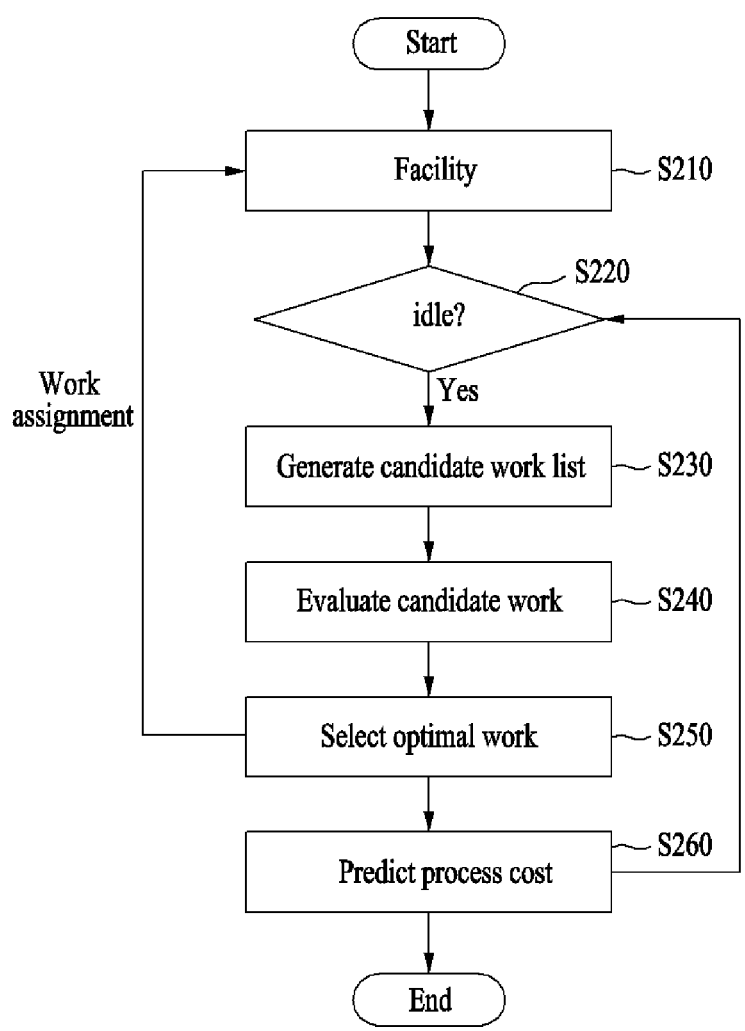
FIG. 4 is a flowchart illustrating an example of assigning a work for each facility according to an example embodiment.

FIG. 4 is a flowchart illustrating an example of assigning a work for each facility according to an example embodiment.

S210 of repeating a work assignment on the side of a facility, for example, a presser, a ring-miller, and a cutter, will be described with reference to FIG. 4.

When a facility is in an idle state in operation S220, a candidate work list may be generated in operation S230 and a candidate work may be evaluated in operation S240. Through this, an optimal work may be selected in operation S250 and the work may be assigned. In operation S260, a process cost may be predicted, which may apply to operation S220.

If there is no more candidate work, that is, if all of the works are completed, the simulation may be terminated. As the simplest example of a method of evaluating a candidate work, the evaluation may be performed based on a deadline priority. In the case of a presser, a tool needs to be replaced based on a shape of a product. Accordingly, a priority of a candidate work may be determined by adding whether a corresponding work requires a tool replacement.

Meanwhile, since a subsequent raw material combination is placed in a furnace after terminating running of the furnace without considering a situation of another facility, an unnecessary standby situation may occur until a heated material is extracted. Accordingly, a heating start time may be adjusted such that there is no waiting time after a primary heating of the furnace is completed.

Also, a heat treatment process may be performed by placing a plurality of works in a heat treatment furnace, such as in the heating process, instead of processing a work one by one. Accordingly, works of which a front end process is completed may be in a standby queue until a desired number of works are collected and then be processed.

Here, if the works are in the standby queue until the capacity of the heat treatment furnace is filled, a deadline may be overdue. Accordingly, it is possible to wait until there is no issue in meeting the deadline by predicting a heat treatment process time required for a list of heat treatment process works that are collected up to date based on a work with a most imminent deadline among the works in a standby queue.

Figure 5:
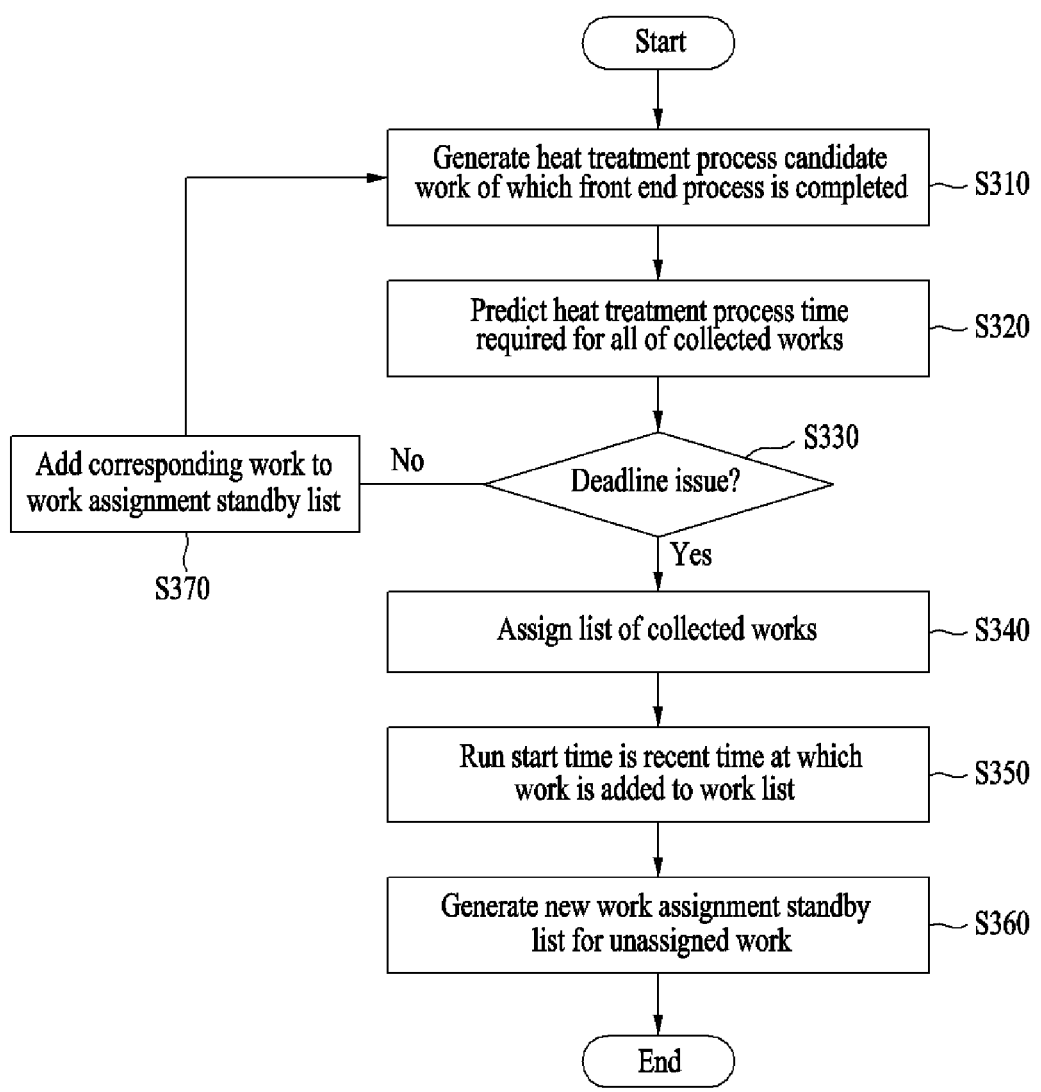
FIG. 5 is a flowchart illustrating an example of a work assignment method of a heat treatment furnace according to an example embodiment.

FIG. 5 is a flowchart illustrating an example of a work assignment method of a heat treatment furnace according to an example embodiment.

An example of a work assignment method of a heat treatment furnace is described with reference to FIG. 5. Referring to FIG. 5, a heat treatment process candidate work of which a front end process is completed may be generated in operation S310. In operation S320, a heat treatment process time required for all of collected works may be predicted. In operation S330, an occurrence of a deadline issue may be verified. When the deadline issue does not occur in operation S330, a list of the collected works may be assigned in operation S340. Here, a run start time may be a recent time at which a work is added to a work list in operation S350. In operation S360, a new work assignment standby list may be generated for an unassigned work. When the deadline issue occurs in operation S330, a corresponding work may be added to the work assignment standby list in operation S370 and operation S310 may be performed again.

Although the aforementioned description and the example embodiment of FIG. 5 simply consider only a deadline to evaluate a list of works to be placed in a heat treatment furnace, an optimal assignment list may be determined through versatile evaluation using a predicted energy use amount.

As described above, a work scheduling of the entire process may be established by performing a simulation using a cost prediction model and a work assignment rule for each facility and a process lead time and an energy use amount may be derived.

As described above, a process lead time prediction model and an energy use amount prediction model according to a work for each facility may be used to establish and evaluate a work scheduling. The models may be trained using a machine training algorithm based on process data.

Since process data is continuously collected over time, the accuracy of a model may be improved by periodically retraining the models based on such process data.

Depending on example embodiments, it is possible to improve energy efficiency and productivity by optimizing a work scheduling. Also, since a production cost is predictable at the same time of establishing a work scheduling, it is available for business.

Hereinafter, a scheduling optimization system of a hot process forging process is further described.

Figure 6:
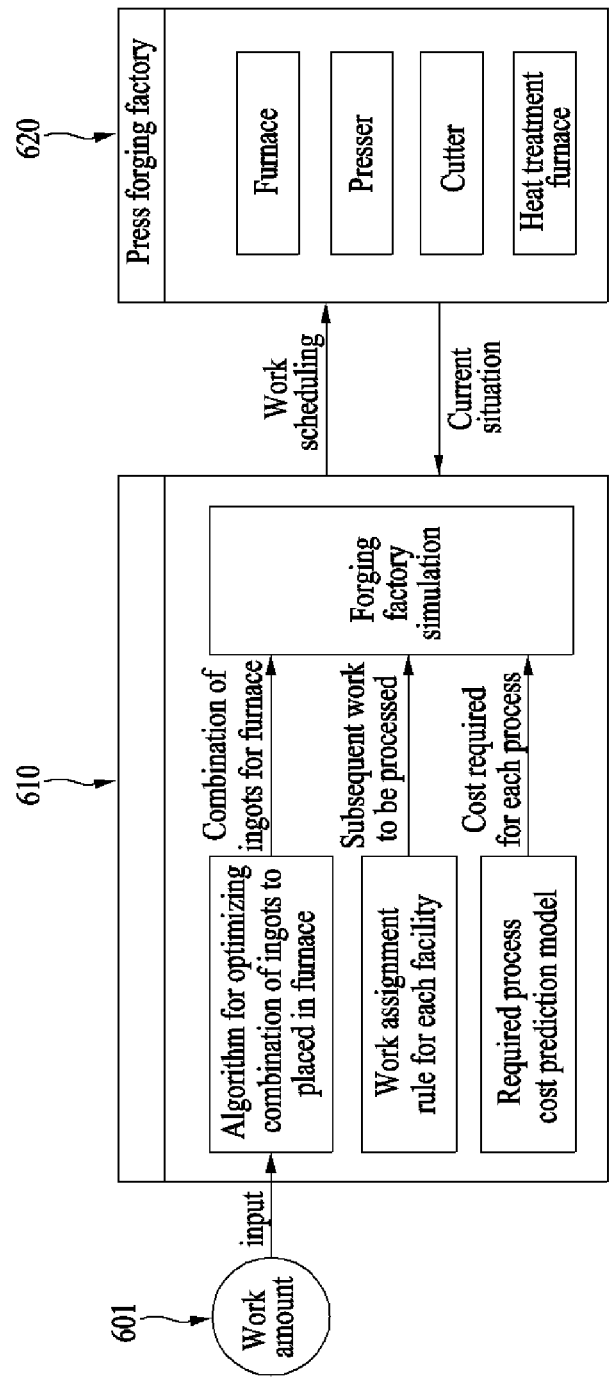
FIG. 6 illustrates an example of an entire system flow according to an example embodiment.

FIG. 6 illustrates an example of an entire system flow according to an example embodiment.

Referring to FIG. 6, a scheduling optimization system 610 may optimize a work scheduling by receiving a work amount 601 and by minimizing a total lead time and energy use amount required for a work. For the work scheduling, a combination of ingots to be placed in a furnace and a heat treatment furnace, an extraction order of an ingot of which a heating is completed in the furnace, and a work order for each facility need to be determined. Herein, the term "ingot" may represent "steel ingot".

Initially, the scheduling optimization system 610 may assign given works in the furnace using an algorithm for optimizing the combination of ingots to be placed in the furnace. When each current work is completed, the corresponding work is moved to a presser, a cutter, and the heat treatment furnace in subsequent process order. Here, a rule for assigning a work to each facility is required. A work assignment heuristic approach for determining a work to be processed by each facility and order of the work based on a work scheduling method of a field is configured. A work may be assigned to each facility based on the work assignment heuristic approach. A process lead time and an energy use amount required for each work may be predicted through a model that is trained based on previous process data. A total work time and energy use amount predicted through the trained model may be used to evaluate the work scheduling.

When the work scheduling is completed through the scheduling optimization system 610, the work scheduling may be applied to a factory environment, for example, a press forging factory 620. However, a result of executing a plan may vary due to a prediction error of a prediction value of the model or a change in an actual environment. To complement this, the scheduling optimization system 610 may perform the work scheduling during a predetermined period of time and may rebuild the plan based on a progress status of the present time. Through such a repetitive rescheduling, the scheduling optimization system 610 may optimize the work scheduling based on an environmental change.

For a simulation of a process work, a work time and an energy use amount for each process need to be known. Many factors may affect each process cost, which makes it difficult to derive a simple equation.

A cost prediction model for predicting an energy use amount and a work lead time for each facility may be trained based on previous process data for each facility. The work lead time and the energy consumption amount may be predicted every time each process is assigned. A time predicted using a training model may be regarded as a work end time.

Figure 7:
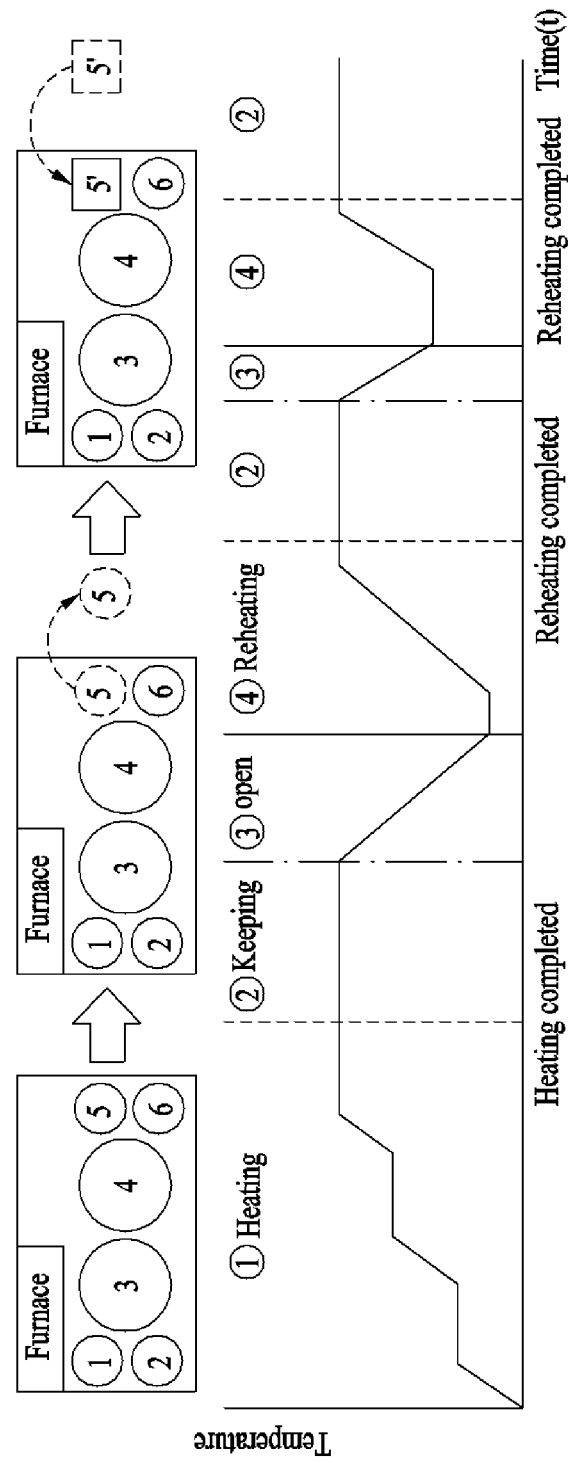
FIG. 7 illustrates an example of a change in a temperature of a furnace according to an example embodiment.

FIG. 7 illustrates an example of a change in a temperature of a furnace according to an example embodiment.

Referring to FIG. 7, a change in an inside temperature by a status of a furnace may be verified. Once the furnace starts to be heated, a door of the furnace cannot be opened until the furnace reaches an appropriate temperature. Once the inside temperature reaches a desired temperature, the inside temperature is maintained to be constant. In a state in which heating of the furnace is completed, the door is opened and closed to place and extract an ingot. Here, reheating is required due to a heat loss caused by opening and closing the door. Accordingly, the furnace includes a heating state, a door closed/opened state, a reheating state, and a keeping state.

FIGS. 8A, 8B, 9A, 9B, and 10 illustrate examples of a cost prediction model for each state of a furnace according to an example embodiment.

Figure 8A:
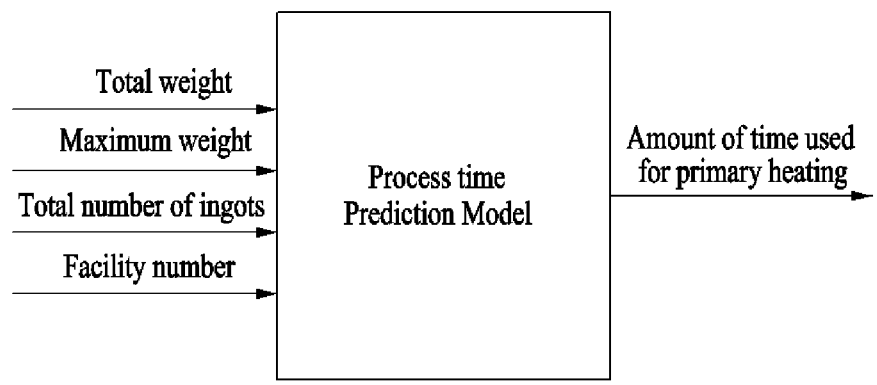
FIGS. 8A, 8B, 9A, 9B, and 10 illustrate examples of a cost prediction model for each state of a furnace according to an example embodiment.
Figure 8B:
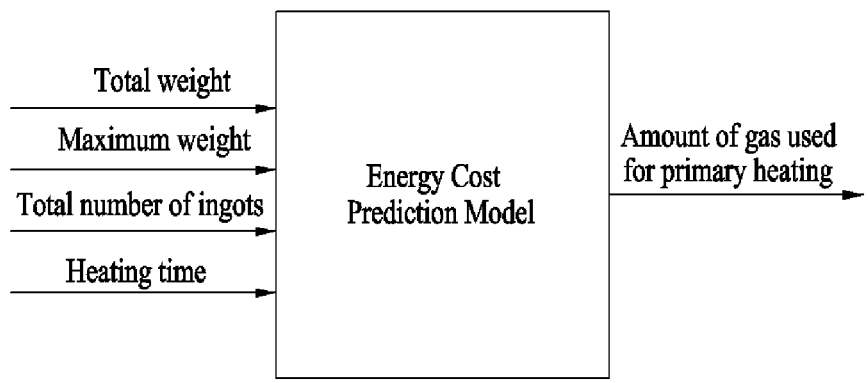
Figure 9A:
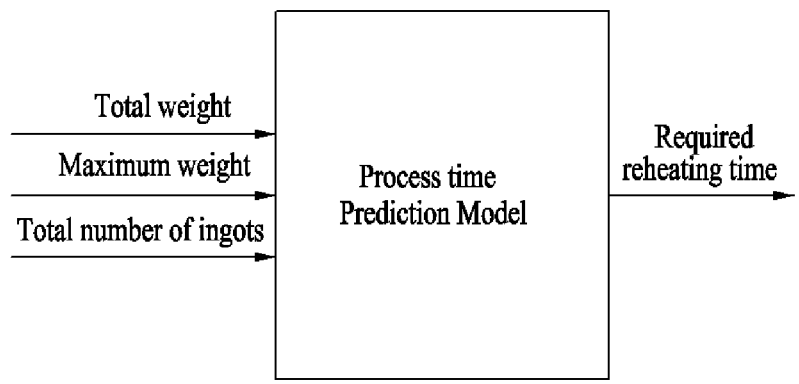
Figure 9B:
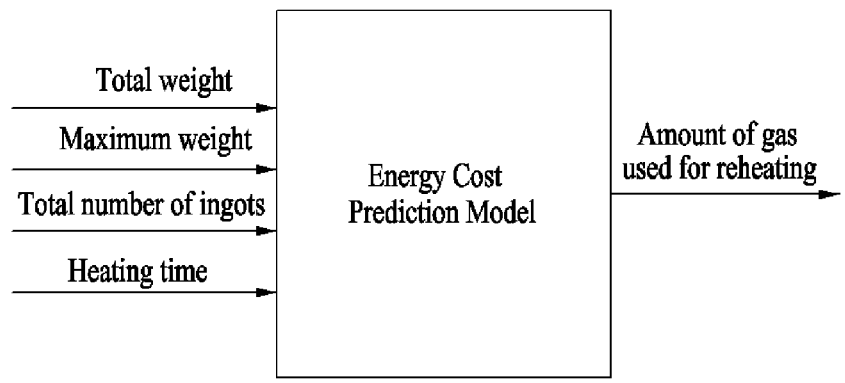
Figure 10:
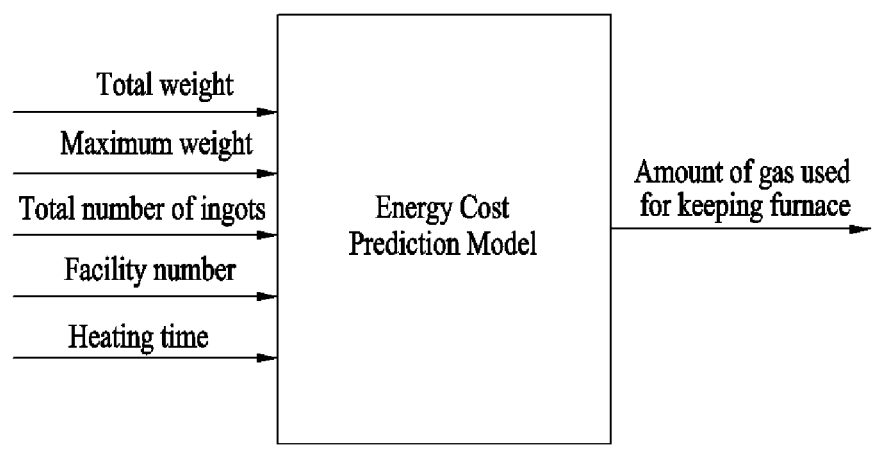

FIGS. 8A and 8B illustrate examples of a heating cost prediction model according to an example embodiment, FIGS. 9A and 9B illustrate examples of a reheating cost prediction model according to an example embodiment, and FIG. 10 illustrates an example of an energy use amount prediction model in a furnace keeping section according to an example embodiment.

Figure 11A:
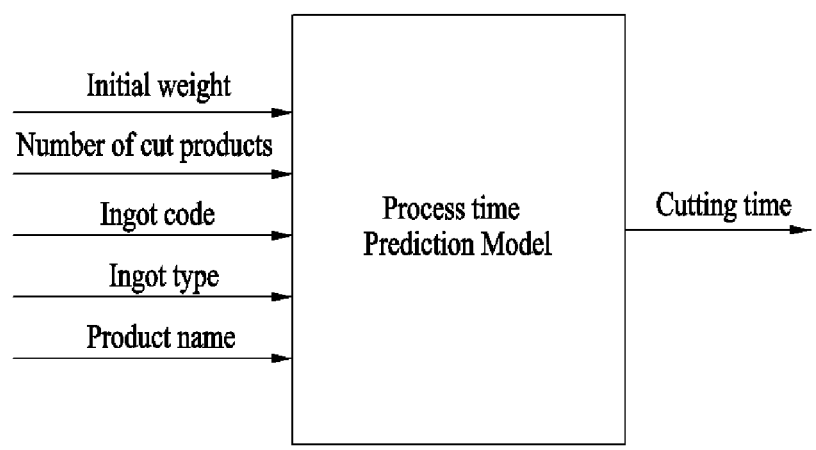
FIGS. 11A and 11B illustrate examples of a cutting and forging time prediction model according to an example embodiment.
Figure 11B:
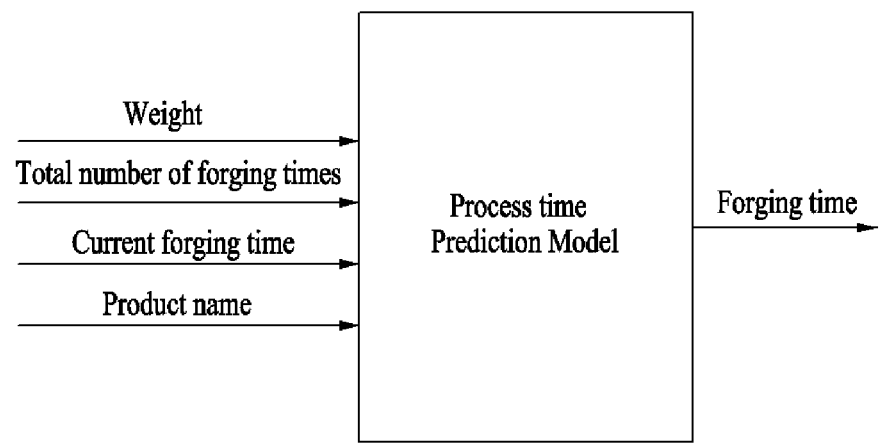

FIGS. 11A and 11B illustrate examples of a cutting and forging time prediction model according to an example embodiment.

FIGS. 11A and 11B illustrate examples of a cutting and forging time prediction model, and a process time for cutting and forging varies based on a product. Accordingly, a characteristic of an ingot and a characteristic of a product need to be considered. An amount of energy used for cutting and forging is very insignificant compared to an amount of energy used for a furnace and a heat treatment furnace and accordingly, does not greatly affect the energy efficiency. Therefore, the amount of energy used for cutting and forging is not predicted herein.

Figure 12A:
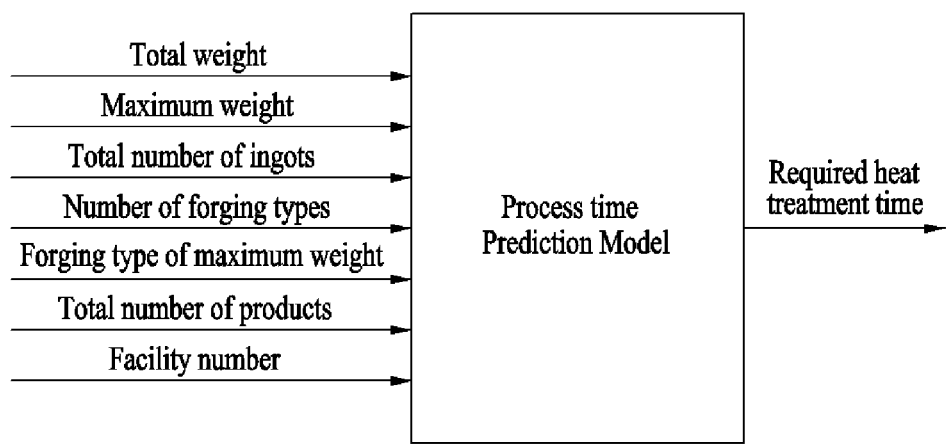
FIGS. 12A and 12B illustrate examples of a cost prediction model of a heat treatment furnace according to an example embodiment.
Figure 12B:
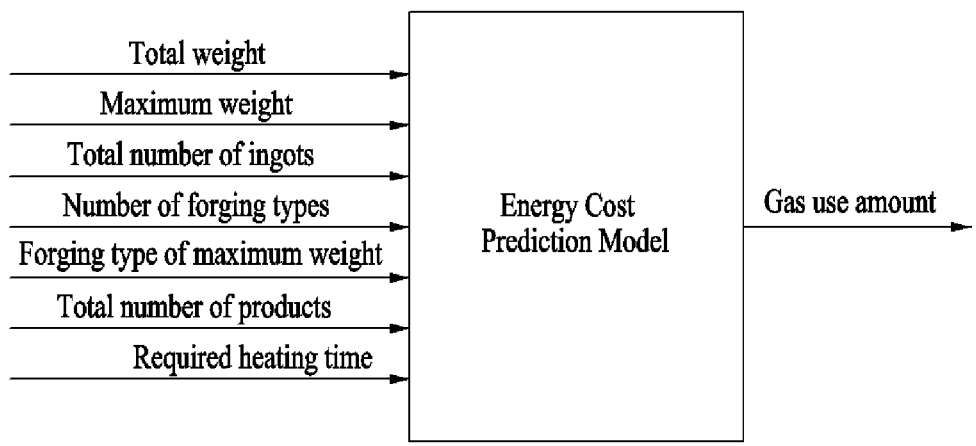

FIGS. 12A and 12B illustrate examples of a cost prediction model of a heat treatment furnace according to an example embodiment.

FIGS. 12A and 12B illustrate an example of a cost prediction model of a heat treatment furnace, which may be affected by a combination of ingots, which is similar to a furnace.

Figures 13, 14:
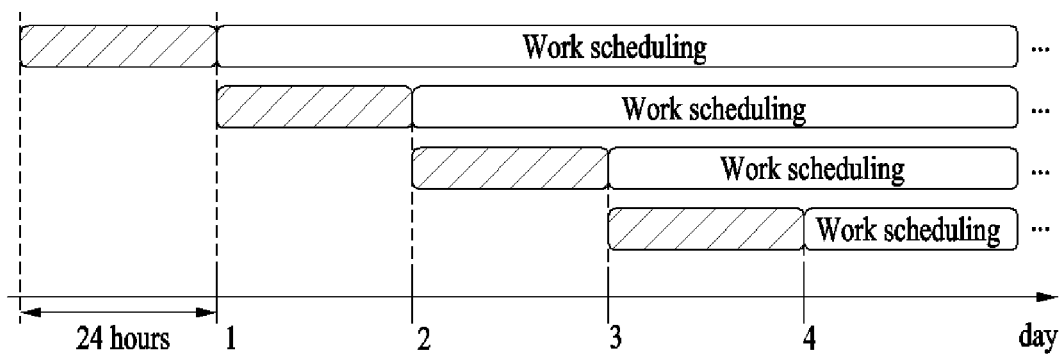
FIG. 13 illustrates an example of representing a solution of a combination of ingots to be placed in a furnace according to an example embodiment.
FIG. 14 illustrates an example of repeatedly reestablishing a work scheduling according to an example embodiment.

FIG. 13 illustrates an example of representing a solution of a combination of ingots to be placed in a furnace according to an example embodiment.

Referring to FIG. 13, a predetermined work amount may be assigned to each furnace for primary heating. A genetic algorithm may be used to optimize a combination of ingots to be placed in a furnace.

A furnace number may be assigned to each ingot. Here, an ingot with an imminent deadline may be preferentially assigned to the furnace. When the furnace has completed a previous work and is capable of performing a subsequent work, a combination of ingots may be assigned to the corresponding furnace. An ingot may be assigned until the capacity of the furnace becomes full. The furnace to which assignment is completed may start to be heated. The aforementioned process may be repeated until all of the ingots are assigned to the furnace.

Once all of the ingots are extracted, the furnace may terminate a current work and may be in a standby state until a subsequent combination of ingots is assigned to the furnace. The furnace of which the assigned work is completed may reduce a heating start time by a heating keeping time until the door is initially opened immediately after a primary heating is completed. An amount of energy used may be reduced by reducing a furnace process time by adjusting the heating start time.

A subsequent process may start for a completely heated ingot. The entire work scheduling may be simulated based on a heuristic rule considering a cost prediction model and a field work assignment method. When the entire scheduling is completed, the work scheduling may be evaluated. An evaluation criterion may include a total production, a total work period, and an energy use amount. A work scheduling that requires a relatively small production cost and a great production may be relatively highly evaluated.

Other works aside from the primary heating work may follow a work assignment heuristic rule that employs a field method.

Once the door is opened, a heat loss occurs in a furnace and the furnace needs to be reheated. Accordingly, if opening and closing of the furnace is minimized, energy may be saved. An ingot that needs to be reheated may be preferentially assigned to the furnace of which the door is open at a point in time at which the reheat is required. If doors of all of the furnaces are closed, a door of a furnace that is not being heated may be opened and an ingot may be assigned to the furnace.

A cutter and a presser may preferentially process a work with an imminent deadline. An ingot to be cut or forged may be brought. If a door of the furnace is openable, a work may be assigned to the furnace. The aforementioned process may be repeated until all of the cutting and forging process is terminated.

A heat treatment may be performed by placing a plurality of ingots in a furnace at a time. Accordingly, once all of the works that require the heat treatment are collected by a capacity of a heat treatment furnace, the collected works may be placed in the heat treatment furnace and a process may start. Here, a work with an imminent deadline may be preferentially assigned to the heat treatment furnace. If a predicted heat treatment completion time exceeds the deadline, the process may start without waiting until the works are collected by the capacity.

If scheduling for all of the works is completed, the scheduling may be applied. Due to an error rate of a prediction model and a change or an accident in a real situation, the scheduling may vary. Accordingly, the scheduling may be reestablished at desired time intervals to verify an actual process status and to apply to the scheduling.

FIG. 14 illustrates an example of repeatedly reestablishing a work scheduling according to an example embodiment.

Referring to FIG. 14, for example, an established scheduling may proceed during 24 hours and the scheduling may be reestablished by applying a status and complementing the scheduling. The scheduling may be optimized by repeatedly reestablishing the scheduling.

As described above, a production cost may be saved and productivity may be improved by optimizing a work scheduling of a hot process forging process. In particular, a combination of ingots to be placed in a furnace may be optimized using a genetic algorithm and the work scheduling may be established using a work assignment heuristic approach. The optimal work scheduling may be established by measuring an energy use amount and a lead time of the work scheduling based on a previous data-based cost prediction model, by evaluating the work scheduling, and by repeatedly reestablishing the work scheduling.

The systems or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A scheduling optimization system of a hot process forging process, the scheduling optimization system comprising:
   a scheduling optimization module configured to receive an order amount and to establish a work scheduling,
   a scheduling evaluation module configured to receive the established work scheduling from the scheduling optimization module, to evaluate the work scheduling based on a predicted lead time and energy use amount derived through a cost prediction model-based simulation, and to forward an evaluation result to the scheduling optimization module; and
   a process cost prediction model management module configured to update a cost prediction model of the scheduling evaluation module based on process data that is continuously accumulated,
   wherein the scheduling optimization module and the scheduling evaluation module are configured to establish the optimal work scheduling,
   wherein the scheduling optimization module is further configured to acquire a work status for each facility and a current energy use status through interaction with a runtime process monitoring system, and to establish the work scheduling by applying the work status for each facility and the current energy use status,
   wherein the process cost prediction model management module is further configured to establish the optimal work scheduling using a rolling horizon scheme of updating the optimal work scheduling being applied to apply a prediction error or an amount modification and thereby periodically updating the work scheduling,
   wherein the scheduling evaluation module is further configured to establish a work scheduling of a rear end process through the cost prediction model-based simulation when a combination of raw materials to be placed in a furnace is determined, and to derive the work scheduling of the entire process and the predicted lead time and energy use amount when the cost prediction model-based simulation is completed,
   wherein the cost prediction model comprises a required heating time prediction model, a heating gas use amount prediction model, a required reheating time prediction model, a reheating gas use amount prediction model, a furnace keeping gas use amount prediction model, a cutting time prediction model, a forging time prediction model, a required heat treatment time prediction model, and a gas use amount prediction model,
   wherein the required heating time prediction model is updated based on a total weight, a maximum weight, a total number of ingots, and a facility number in the process data,
   wherein the heating gas use amount prediction model is updated based on a total weight, a maximum weight, a total number of ingots, and a heating time in the process data,
   wherein the required reheating time prediction model is updated based on a total weight, a maximum weight, and a total number of ingots in the process data,
   wherein the reheating gas use amount prediction model is updated based on a total weight, a maximum weight, a total number of ingots, and a heating time in the process data,
   wherein the furnace keeping gas use amount prediction model is updated based on a total weight, a maximum weight, a total number of ingots, a facility number, and a heating time in the process data,
   wherein the cutting time prediction model is updated based on an initial weight, a number of cut products, an ingot code, an ingot type, and a product name in the process data,
   wherein the forging time prediction model is updated based on a weight, a total number of forging times, a current forging time, and a product name in the process data,
   wherein the required heat treatment time prediction model is updated based on a total weight, a maximum weight, a total number of ingots, a number of forging types, a forging type of the maximum weight, a total number of products, and a facility number in the process data, and
   wherein the gas use amount prediction model is updated based on a total weight, a maximum weight, a total number of ingots, a number of forging types, a forging type of the maximum weight, a total number of products, and a required heating time in the process data.

2. The scheduling optimization system of claim 1, wherein the scheduling optimization module is configured to directly receive the order amount every time an order is received from an operator or to acquire the order amount through interaction with an Enterprise Resource Planning (ERP) system.

3. The scheduling optimization system of claim 1, wherein the scheduling optimization module is configured to establish the work scheduling by selecting a relatively high priority order amount from among the received order amounts.

4. The scheduling optimization system of claim 1, wherein the cost prediction model is trained using a machine training algorithm based on the process data.

5. The scheduling optimization system of claim 1, wherein the scheduling evaluation module is configured to place a raw material in the furnace according to the work scheduling of the furnace, to find a predicted point in time at which a heating is completed using a lead time prediction model of a heating process, to allow a facility that requires to determine a work to subsequently process to select and process a relatively high priority work from among candidate works that are completely heated and thereby extractable, to predict a predicted lead time and energy use amount of process processing of each facility through a lead time prediction model and an energy use amount prediction model of a process for each facility, and to repeatedly perform a simulation until all of the products are completed.

6. A scheduling optimization method of a hot process forging process, the scheduling optimization method comprising:
   receiving, by a scheduling optimization module of a scheduling optimization system of the hot process forging process, an order amount;

establishing, by the scheduling optimization module, a work scheduling for the received order amount;

evaluating, by a scheduling evaluation module of the scheduling optimization system, the established work scheduling based on a predicted lead time and energy use amount derived through a cost prediction model-based simulation; and receiving, by the scheduling optimization module, an evaluation result from the scheduling evaluation module in response to termination of evaluation and applying the optimal work scheduling, wherein the scheduling optimization method further comprises:

updating, by the process cost prediction model management module of the scheduling optimization system, a cost prediction model of the scheduling evaluation module based on process data that is continuously accumulated and to update the optimal work scheduling being applied to apply a prediction error or an amount modification, wherein the scheduling optimization method further comprises:

acquiring, by the scheduling optimization module, a work status for each facility and a current energy use status through interaction with a runtime process monitoring system, and wherein the establishing of the work scheduling for the received order amount comprises establishing the work scheduling by applying the work status for each facility and the current energy use status, wherein the updating of the optimal work scheduling being applied comprises establishing the optimal work scheduling using a rolling horizon scheme of periodically updating the work scheduling, wherein the evaluating of the work scheduling based on the predicted lead time and energy use amount derived through the cost prediction model-based simulation comprises establishing, by the scheduling evaluation module, a work scheduling of a rear end process through the cost prediction model-based simulation when a combination of raw materials to be placed in a furnace is determined, wherein the work scheduling of the entire process and the predicted lead time and energy use amount are derived when the cost prediction model-based simulation is terminated, wherein the cost prediction model comprises a required heating time prediction model, a heating gas use amount prediction model, a required reheating time prediction model, a reheating gas use amount prediction model, a furnace keeping gas use amount prediction model, a cutting time prediction model, a forging time prediction model, a required heat treatment time prediction model, and a gas use amount prediction model, wherein the required heating time prediction model is updated based on a total weight, a maximum weight, a total number of ingots, and a facility number in the process data, wherein the heating gas use amount prediction model is updated based on a total weight, a maximum weight, a total number of ingots, and a heating time in the process data, wherein the required reheating time prediction model is updated based on a total weight, a maximum weight, and a total number of ingots in the process data, wherein the reheating gas use amount prediction model is updated based on a total weight, a maximum weight, a total number of ingots, and a heating time in the process data, wherein the furnace keeping gas use amount prediction model is updated based on a total weight, a maximum weight, a total number of ingots, a facility number, and a heating time in the process data, wherein the cutting time prediction model is updated based on an initial weight, a number of cut products, an ingot code, an ingot type and a product name in the process data, wherein the forging time prediction model is updated based on a weight, a total number of forging times, a current forging time, and a product name in the process data, wherein the required heat treatment time prediction model is updated based on a total weight, a maximum weight, a total number of ingots, a number of forging types, a forging type of the maximum weight, a total number of products, and a facility number in the process data, and wherein the gas use amount prediction model is updated based on a total weight, a maximum weight, a total number of ingots, a number of forging types, a forging type of the maximum weight, a total number of products, and a required heating time in the process data.

7. The scheduling optimization method of claim 6, wherein the receiving of the order amount comprises directly receiving the order amount every time an order is received from an operator or acquiring the order amount through interaction with an Enterprise Resource Planning (ERP) system.

8. The scheduling optimization method of claim 6, further comprising:

selecting, by the scheduling optimization module, a relatively high priority order amount from among the received order amounts prior to establishing the work scheduling, and wherein the establishing of the work scheduling for the received order amount comprises establishing the work scheduling for the selected relatively high priority order amount.

9. The scheduling optimization method of claim 6, wherein the cost prediction model is trained using a machine training algorithm based on the process data.

10. The scheduling optimization method of claim 6, wherein the establishing of the work scheduling of the rear process through the cost prediction model-based simulation comprises:

placing a raw material in the furnace according to the work scheduling of the furnace;

finding a predicted point in time at which a heating is completed using a lead time prediction model of a heating process;

allowing a facility that requires to determine a work to subsequently process to select and process a relatively high priority work from among candidate works that are completely heated and thereby extractable;

predicting a predicted lead time and energy use amount of process processing of each facility through a lead time prediction model and an energy use amount prediction model of a process for each facility; and repeatedly performing a simulation until all of the products are completed.

11. The scheduling optimization method of claim 6, wherein the combination of raw materials to be placed in the furnace is determined by optimizing the work scheduling using a genetic algorithm.

\* \* \* \* \*